(12) United States Patent
Shiohara

(10) Patent No.: US 7,949,223 B2
(45) Date of Patent: *May 24, 2011

(54) DIGITAL CAMERA AND PRINTING SYSTEM

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1690 days.

This patent is subject to a terminal disclaimer.

(21) Appl. No.: 10/298,085

(22) Filed: Nov. 18, 2002

(65) Prior Publication Data

US 2003/0122934 A1    Jul. 3, 2003

Related U.S. Application Data

(63) Continuation of application No. 09/081,786, filed on May 20, 1998, now Pat. No. 6,618,553.

(30) Foreign Application Priority Data

May 26, 1997 (JP) .................................. P. 9-135378
May 6, 1998  (JP) ................................. P. 10-123760

(51) Int. Cl.
 H04N 5/77   (2006.01)
 H04N 5/775  (2006.01)
(52) U.S. Cl. ........................................ 386/224; 386/230
(58) Field of Classification Search .................. 386/117, 386/46, 107, 38, 1, 52, 123, 224, 230, 210
 See application file for complete search history.

(56) References Cited

U.S. PATENT DOCUMENTS

| | | |
|---|---|---|
| 4,802,019 A | 1/1989 | Harada et al. |
| 4,827,347 A | 5/1989 | Bell |
| 4,937,676 A | 6/1990 | Finelli et al. |
| 4,942,477 A | 7/1990 | Nakamura |
| 5,016,107 A | 5/1991 | Sasson et al. |
| 5,126,851 A * | 6/1992 | Yoshimura et al. ............. 386/60 |
| 5,142,310 A | 8/1992 | Taniguchi et al. |
| 5,153,730 A | 10/1992 | Nagasaki |
| 5,164,831 A | 11/1992 | Kuchta et al. |
| 5,189,511 A | 2/1993 | Parulski et al. |
| 5,432,532 A | 7/1995 | Mochimaru et al. |
| 5,473,370 A | 12/1995 | Moronaga et al. |
| 5,528,285 A | 6/1996 | Morikawa et al. |

(Continued)

FOREIGN PATENT DOCUMENTS

DE    196 45 716 A1    5/1997

(Continued)

OTHER PUBLICATIONS

Mikio Watanabe et al (Imaging on the Information Superhighway) 1995, pp. 421-424, XP000618775, "An Image Data File Format for Digital Still Camera".

(Continued)

Primary Examiner — Robert Chevalier
(74) Attorney, Agent, or Firm — Sughrue Mion, PLLC

(57) ABSTRACT

With a digital camera 100, a photographed image 31 is displayed on a liquid crystal display and the user selects a desired image and specifies print specifications of the number of print sheets, a print paper size, a print color mode, etc., then print image data is prepared. The prepared print image data is transmitted from the digital camera 100 to a color printer of an output unit. An image is printed at the color printer in accordance with the print image data.

63 Claims, 10 Drawing Sheets

U.S. PATENT DOCUMENTS

| | | | |
|---|---|---|---|
| 5,541,656 A | 7/1996 | Kare et al. | |
| 5,550,646 A | 8/1996 | Hassan et al. | |
| 5,604,860 A | 2/1997 | McLaughlin et al. | |
| 5,606,420 A | 2/1997 | Maeda et al. | |
| 5,608,542 A | 3/1997 | Krahe et al. | |
| 5,617,119 A | 4/1997 | Briggs et al. | |
| 5,619,738 A | 4/1997 | Petruchik | |
| 5,666,159 A | 9/1997 | Parulski | |
| 5,682,441 A | 10/1997 | Ligtenberg et al. | |
| 5,706,097 A | 1/1998 | Shelling et al. | |
| 5,710,954 A | 1/1998 | Inoue | |
| 5,724,155 A | 3/1998 | Saito | |
| 5,724,579 A | 3/1998 | Suzuki | |
| 5,737,491 A | 4/1998 | Allen et al. | |
| 5,739,924 A | 4/1998 | Sano | |
| 5,742,339 A | 4/1998 | Wakui | |
| 5,777,723 A | 7/1998 | Iwasaki et al. | |
| 5,828,461 A | 10/1998 | Kubo | |
| 5,832,337 A | 11/1998 | Isemura | |
| 5,903,309 A | 5/1999 | Anderson | |
| 5,933,137 A | 8/1999 | Anderson | |
| 5,966,553 A * | 10/1999 | Nishitani et al. | 396/303 |
| 5,974,386 A | 10/1999 | Ejima et al. | |
| 6,002,429 A | 12/1999 | Ochi et al. | |
| 6,097,431 A | 8/2000 | Anderson | |
| 6,104,430 A | 8/2000 | Fukuoka | |
| 6,111,605 A | 8/2000 | Suzuki | |
| 6,115,137 A | 9/2000 | Ozawa et al. | |
| 6,118,480 A | 9/2000 | Anderson | |
| 6,147,703 A | 11/2000 | Miller | |
| 6,147,708 A | 11/2000 | Suzuki et al. | |
| 6,167,469 A | 12/2000 | Safai et al. | |
| 6,195,513 B1 | 2/2001 | Nihei et al. | |
| 6,233,015 B1 | 5/2001 | Miller | |
| 6,433,820 B1 | 8/2002 | Koide et al. | |
| 6,441,854 B2 | 8/2002 | Fellegara | |
| 6,445,412 B1 | 9/2002 | Shiohara | |
| 6,493,757 B1 | 12/2002 | Sakai et al. | |
| 6,507,371 B1 | 1/2003 | Hashimoto | |
| 6,542,192 B2 | 4/2003 | Akiyama | |
| 6,545,687 B2 | 4/2003 | Scott et al. | |
| 6,552,743 B1 | 4/2003 | Rissman | |
| 6,573,927 B2 | 6/2003 | Parulski et al. | |
| 6,587,140 B2 | 7/2003 | No | |
| 6,603,506 B2 | 8/2003 | Ogawa | |
| 6,680,749 B1 | 1/2004 | Anderson et al. | |
| 6,701,011 B1 | 3/2004 | Nakajima | |
| 6,715,003 B1 | 3/2004 | Safai | |
| 6,771,896 B2 | 8/2004 | Tamura | |
| 6,784,924 B2 | 8/2004 | Ward et al. | |
| 6,879,342 B1 | 4/2005 | Miller et al. | |
| 2001/0000969 A1 | 5/2001 | Ohta et al. | |
| 2002/0186307 A1 | 12/2002 | Anderson | |
| 2003/0122932 A1 | 7/2003 | Shiohara | |
| 2003/0122933 A1 | 7/2003 | Shiohara | |
| 2003/0122935 A1 | 7/2003 | Shiohara | |
| 2003/0142215 A1 | 7/2003 | Ward et al. | |
| 2006/0017956 A1 | 1/2006 | Shiohara | |
| 2006/0023085 A1 | 2/2006 | Shiohara | |
| 2006/0023086 A1 | 2/2006 | Shiohara | |
| 2006/0023087 A1 | 2/2006 | Shiohara | |
| 2006/0023088 A1 | 2/2006 | Shiohara | |
| 2006/0023101 A1 | 2/2006 | Shiohara | |
| 2006/0023103 A1 | 2/2006 | Shiohara | |
| 2006/0023104 A1 | 2/2006 | Shiohara | |
| 2006/0029360 A1 | 2/2006 | Shiohara | |
| 2006/0029361 A1 | 2/2006 | Shiohara | |
| 2006/0029362 A1 | 2/2006 | Shiohara | |
| 2006/0072016 A1 | 4/2006 | Shiohara | |
| 2006/0238636 A1 | 10/2006 | Shiohara | |
| 2007/0097427 A1 | 5/2007 | Shiohara | |
| 2007/0097442 A1 | 5/2007 | Shiohara | |

FOREIGN PATENT DOCUMENTS

| | | |
|---|---|---|
| EP | 0 356 351 | 2/1990 |
| EP | 0 382 044 | 8/1990 |
| EP | 0 422 447 A2 | 4/1991 |
| GB | 2269292 A1 | 2/1994 |
| JP | 64-84980 | 3/1989 |
| JP | A-1-309474 | 12/1989 |
| JP | 2-142281 A | 5/1990 |
| JP | 05-037789 | 2/1993 |
| JP | 05-056381 | 3/1993 |
| JP | 5-75966 A | 3/1993 |
| JP | 5-083435 | 4/1993 |
| JP | 5-083735 | 4/1993 |
| JP | 5-91452 A | 4/1993 |
| JP | 06-8537 A | 1/1994 |
| JP | 06-022200 | 1/1994 |
| JP | 06-070054 A | 3/1994 |
| JP | 6-95236 A | 4/1994 |
| JP | 6-133264 A | 5/1994 |
| JP | 06-197304 | 7/1994 |
| JP | 06-245121 | 9/1994 |
| JP | 06-253246 A | 9/1994 |
| JP | 06-276473 | 9/1994 |
| JP | 6-303466 | 10/1994 |
| JP | 06-311466 | 11/1994 |
| JP | 06 315106 A | 11/1994 |
| JP | 07-030706 | 1/1995 |
| JP | 07 38674 A | 2/1995 |
| JP | 7-046526 A | 2/1995 |
| JP | 7-131684 A | 5/1995 |
| JP | 7-143426 | 6/1995 |
| JP | 07 162750 A | 6/1995 |
| JP | 7-182366 A | 7/1995 |
| JP | 07-202982 A1 | 8/1995 |
| JP | 07 245723 A | 9/1995 |
| JP | 7-306933 | 11/1995 |
| JP | 7-327239 | 12/1995 |
| JP | 8-18911 | 1/1996 |
| JP | 08-065613 | 3/1996 |
| JP | 08 098124 A | 4/1996 |
| JP | 08 186790 A | 7/1996 |
| JP | 08 205014 A | 8/1996 |
| JP | 08 223525 A | 8/1996 |
| JP | 08 228321 A | 9/1996 |
| JP | 8-251463 A | 9/1996 |
| JP | 08-251536 | 9/1996 |
| JP | 8-298612 A | 11/1996 |
| JP | 08 331285 A | 12/1996 |
| JP | 9-005859 | 1/1997 |
| JP | 9-37129 | 2/1997 |
| JP | 09 046577 A | 2/1997 |
| JP | 09-055851 | 2/1997 |
| JP | 9-83849 A | 3/1997 |
| JP | 09-83921 A | 3/1997 |
| JP | 9-98367 A | 4/1997 |
| JP | 09-116657 A1 | 5/1997 |
| JP | 09-130660 A1 | 5/1997 |
| JP | 9-139876 | 5/1997 |
| JP | 10-108005 A1 | 4/1998 |
| JP | 10-173833 | 6/1998 |
| JP | 10-294918 A1 | 11/1998 |
| WO | WO 9750243 A1 | 12/1997 |
| WO | WO 98/12868 A1 | 3/1998 |

OTHER PUBLICATIONS

Japanese Office Action, Jan. 10, 2006, JPA 10-123760.
Japanese Office Action, Jan. 10, 2006, JPA 2005-272029.
Japanese Office Action, Jan. 10, 2006, JPA 2005-272051.
Japanese Office Action, Jan. 10, 2006, JPA 2005-272059.
Shashin Kogyo (Photo Industry) Apr. 1997, vol. 55, No. 4, Proper Lens Cleaning, pp. 114-116.
Shashin Kogyo (Photo Industry) Oct. 1996, vol. 54, No. 10, Image File Formats According to Purpose, p. 134-135.

* cited by examiner

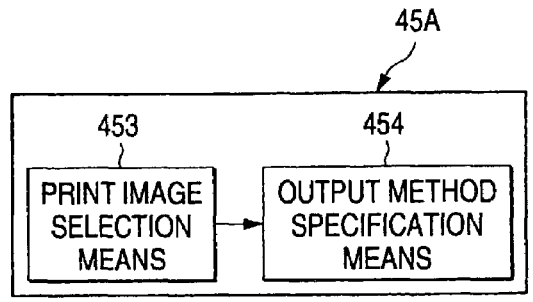
FIG. 3 (a)
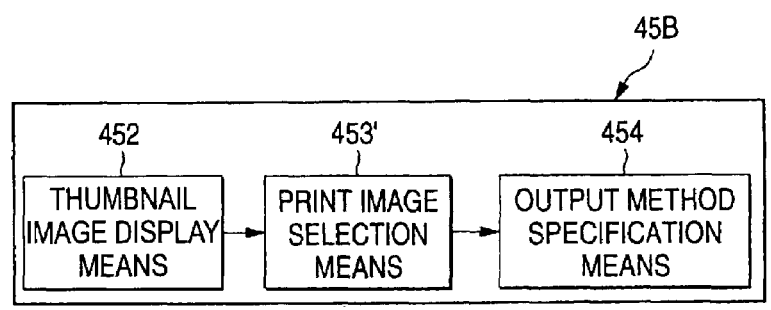
FIG. 3 (b)
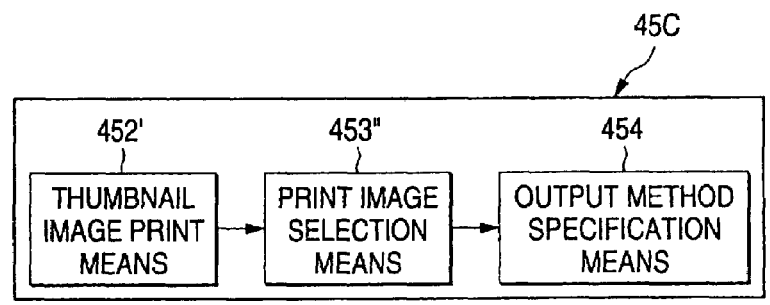
FIG. 3 (c)
FIG. 3 (d)
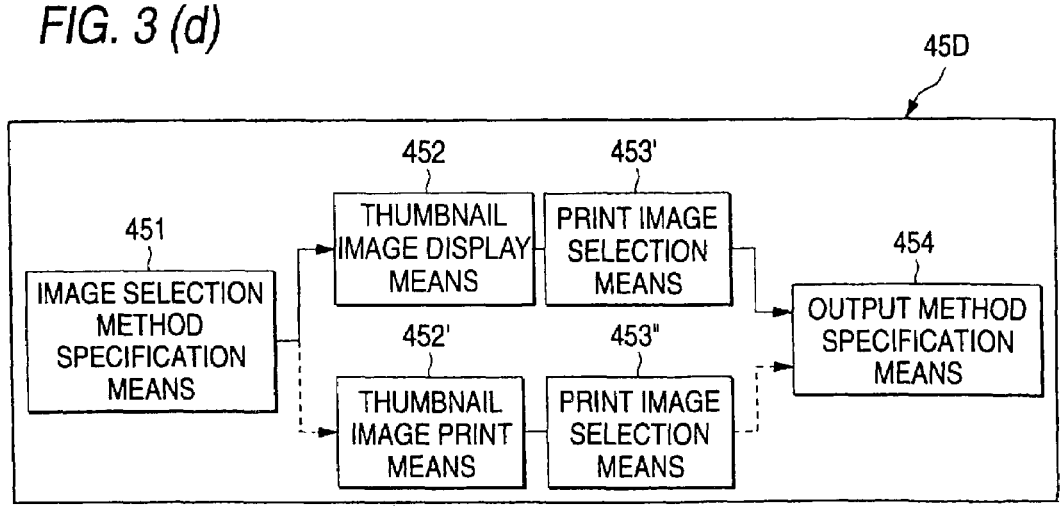

DIGITAL CAMERA AND PRINTING SYSTEM

This is a continuation of application Ser. No. 09/081,786 filed May 20, 1998 now U.S. Pat. No. 6,618,533; the disclosure of which is incorporated herein by reference.

BACKGROUND OF THE INVENTION

1. Field of the Invention

This invention relates to a digital camera and in particular to a digital camera capable of outputting image data directly to a printer and a printing system using the same.

2. Related Art

In recent years, digital cameras (still-video cameras) have been developed, sold, and finding spreading use.

The digital camera is configured to execute photoelectric conversion of image pickup light to provide image data, record the image data on a recording medium, and output the recorded image data to an external image processing system such as a personal computer (PC). The external image processing system performs print image data preparation processing and outputs the prepared print image data to a printer for printing or reproducing the picked-up image on paper.

Most digital cameras comprise each a liquid crystal display for displaying the image pickup result and the image data provided by photoelectric conversion is compressed and recorded on a recording medium. To compress the image data, normally JPEG (Joint Photographic Expert Group) standard is applied.

To select an image on a PC, a number of thumbnail images compressed in JPEG (described later) are previously input and displayed on a monitor. The picked-up image data corresponding to a selected thumbnail image is input from the digital camera and is decompressed, then displayed on the monitor. When the user recognizes it, color print image data preparation processing is performed and the image is printed at a printer connected to the PC.

The thumbnail image is a reduced image used for the user to select a desired image out of the input image data on a PC, etc. For example, assuming that the size of 1-frame image data is 680×480 pixels, the corresponding thumbnail image is reduced by thinning out the data to about 80×60 pixels; the thumbnail images are recorded on a recording medium of the digital camera in a one-to-one correspondence with normal picked-up images.

When color print image data preparation processing is performed, print image data preparation processing is performed by programs on the PC to reproduce or print a color image (video) with high accuracy and bit map data is prepared for each print color required for drawing and is given to a printer together with a control signal for performing the color image reproduction operation on recording paper.

A color print ink jet printer capable of printing a high-quality image like a picture or a photo is developed and sold as a color printer.

The above-mentioned print image data preparation processing programs are contained in a program group called a printer driver in a data processing module 210 as shown in FIG. 11. A printer driver 220 normally comprises three modules of rasterizer, color correction, and halftone as means for obtaining binary data.

However, usually the PC comprises a large number of application programs other than image (video) print processing because of general versatility. The application programs and the above-mentioned printer driver operate under the control of Windows, MS-DOS, etc., (PC operating system (OS) manufactured by Microsoft Corporation).

Therefore, to perform image print processing, the user needs to enter commands as specified by the OS for reading the print processing application program and the printer driver into PC internal memory from a storage unit storing them (for example, magnetic disk) and placing them in an executable state. However, it takes time (so-called overhead time) to enter commands and read the print processing application program and the printer driver; the overhead time requires several minutes at the shortest, thus it takes time to start.

Although PCs are finding remarkable spreading use, many problems remain to be solved for users to know how to actually handle PCs; it is also pointed out that most persons who have PCs cannot master them. If they attempt to install the image (video) print processing application program and the printer driver, they may find it difficult to install the software or may not understand how to enter the commands.

The need for using an expensive PC only for the purpose of printing picked-up images involves remarkable impairment of user's convenience.

Examining demands for simplifying the print processing operation and reducing the overhead time almost to zero from the aspect of the digital camera, preferably, for example, image data can be output from the digital camera directly to a printer without intervention of a PC and a desired picked-up image can be printed on a desired number of print sheets in a desired paper size and print color mode. More preferably, an external unit to which image data is to be transmitted including a printer can be specified.

SUMMARY OF THE INVENTION

It is therefore an object of the invention to provide a digital camera having capabilities of outputting image data directly to an external system and printing a desired image under desired print specifications of the number of print sheets, paper size, print color mode, etc. It is another object of the invention to provide a printing system using the digital camera.

According to one aspect of the invention, there is provided a digital camera for executing photoelectric conversion of image pickup light and then recording the conversion result as image data, the digital camera comprising a display section for displaying an image, a recording medium for recording the image data, image data selection means for selecting desired image data out of the recording medium, and output method specification means for outputting the selected image data to an external system under predetermined output specifications. The image data selection means reads the image data for each frame and adds an index to the image data for display on the display section.

According to another aspect of the invention, there is provided a digital camera for executing photoelectric conversion of image pickup light and then recording the conversion result as image data and thumbnail image data of the image data, the digital camera comprising a display section for displaying an image, a recording medium for recording the image data and the thumbnail image data, thumbnail image display means for reading the thumbnail image data from the recording medium and displaying thumbnail images on the display section, image data selection means for selecting one of the displayed thumbnail images, thereby selecting desired image data corresponding thereto, and output method specification means for outputting the selected image data to an external system under predetermined output specifications. The thumbnail image display means enlarges and displays the thumbnail image.

According to another aspect of the invention, there is provided a digital camera for executing photoelectric conversion of image pickup light and then recording the conversion result as image data and thumbnail image data of the image data, the digital camera comprising a display section for displaying an image, a recording medium for recording the image data and the thumbnail image data, thumbnail image print means for printing out the thumbnail image data recorded on the recording medium at an external printer, thumbnail image display means for reading the thumbnail image data from the recording medium and displaying thumbnail images on the display section, image data selection means for selecting one of the displayed thumbnail images based on the printed thumbnail images, thereby selecting desired image data corresponding thereto, and output method specification means for outputting the selected image data to an external system under predetermined output specifications. The thumbnail image print means adds an index to each thumbnail image data piece and outputs to the external printer and the index of one of the indexed thumbnail images printed is specified, whereby the image data selection means selects desired image data corresponding thereto.

With the digital cameras according to the three aspects of the invention, the external system is a color printer and the predetermined output specifications contain at least one of the number of print copies, a print paper size, and a print color mode for printing the image data. The print color mode is full color, single color, or monochrome. The external system contains a printer or a facsimile or an image processing system connected by a communication line.

A printing system provided according to the invention comprises any of the three types of digital cameras described above and a color printer as an external system.

BRIEF DESCRIPTION OF THE DRAWINGS

In the accompanying drawings:

FIGS. 3(a)-3(d) are block diagrams to show a configuration example of image selection means;

DETAILED DESCRIPTION OF PREFERRED EMBODIMENTS

Figure 1:
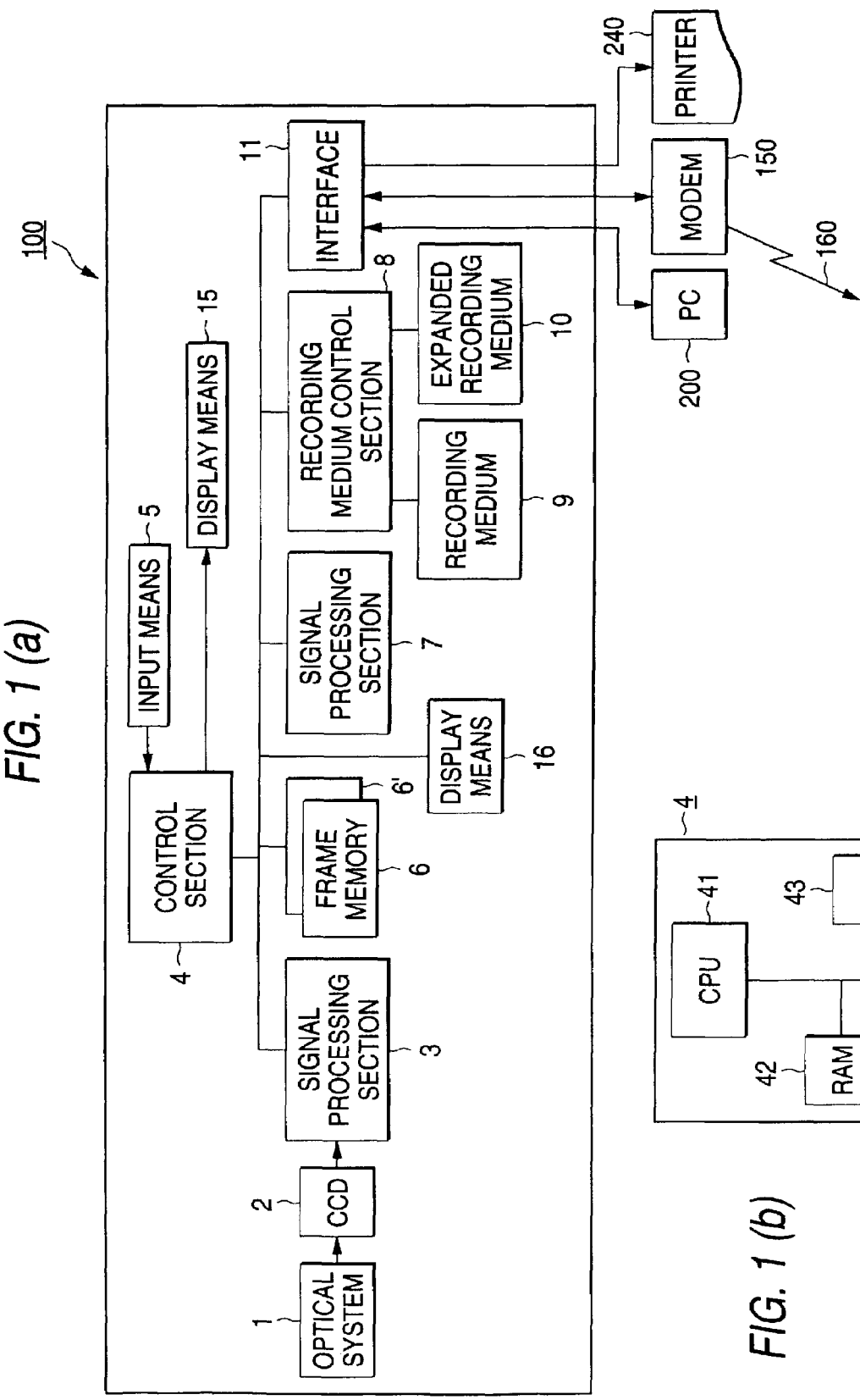
FIGS. 1(a)-1(b) are block diagrams to show a configuration example of a digital camera of the invention.

FIG. 1 is a block diagram to show a configuration example of a digital camera of the invention.

As shown in FIG. 1a, a digital camera 100 comprises an optical system consisting of a lens, an iris mechanism, etc., through which reflected light from an image to be photographed is incident on a CCD 2, the CCD 2 for converting image pickup light from the optical system 1 into an electric signal, a signal processing section 3 for processing the signal from the CCD 2 and outputting the processed signal to a frame memory 6 as multiple-valued (R, G, B) raster data (image data), a control section 4 for controlling the operation of the signal processing section 3, frame memories 6 and 6', a signal processing section 7, and a recording medium control section 8, image processing, image compression/decompression processing, etc., input means 5 for inputting a command entered by the user operating a switch, etc., converting the command into a digital signal, and feeding the digital signal into the control section 4, the signal processing section 7 for converting R, G, B raster data in the frame memory into brightness component Y and color difference components U and V, compressing the data in JPEG, and performing reduction processing for preparing a thumbnail image, a recording medium control section 8 for receiving output of the signal processing section 7 and controlling writing of the image data compressed in JPEG, which will be hereinafter referred to as JPEG image data, and thumbnail image data into predetermined locations of a recording medium 9 or an expanded recording medium 10, read of the recorded JPEG image data therefrom, etc., the recording medium 9 and expanded recording medium 10 for storing image data, an interface 11 used to transfer data to and from an external system, display means 15 of a LED lamp, etc., for displaying the switch state, functional specifications, etc., and display means 16 made of a liquid crystal display, etc., for displaying a photographed image or an object to be picked up.

The frame memory 6 normally is used as an image display memory of the liquid crystal display 16 and image data is expanded in bit map image. The frame memory 6' normally is used as a menu display memory of the liquid crystal display 16. At the display time on the liquid crystal display 16, the contents of the frame memories 6 and 6' are superimposed on each other on the display.

The recording medium 9 is made of a 4-MB flash memory fixed in the camera 100. It can be configured to record not only image data, but also programs, etc. Compact flash (trademark of Sun Disk) having a capacity of 4-40 MB is used as the expanded recording medium 10 in the embodiment.

A serial interface is used as the interface 11 in the embodiment to receive a program sent from a computer such as a PC 200, transmit image data to the PC 200, send image data via a modem 150 to a communication line 160, etc., and transmit print image data to a printer 240 or a facsimile machine.

FIG. 1b shows the configuration of the control section 4 which consists of a CPU 41, a RAM 42, and a ROM 43. The ROM 43 stores control means 430 made up of programs required for operation control of the digital camera 100 and data processing in the digital camera such as data compression processing (FIG. 2).

Print data preparation programs including a printer driver may be stored in the ROM 43. Alternatively, they can also be read from an external recording medium such as magnetic disk, CD-ROM, or a memory card into the recording medium 9 or the expanded recording medium 10 and be read therefrom for execution at a desired time.

Figure 2:
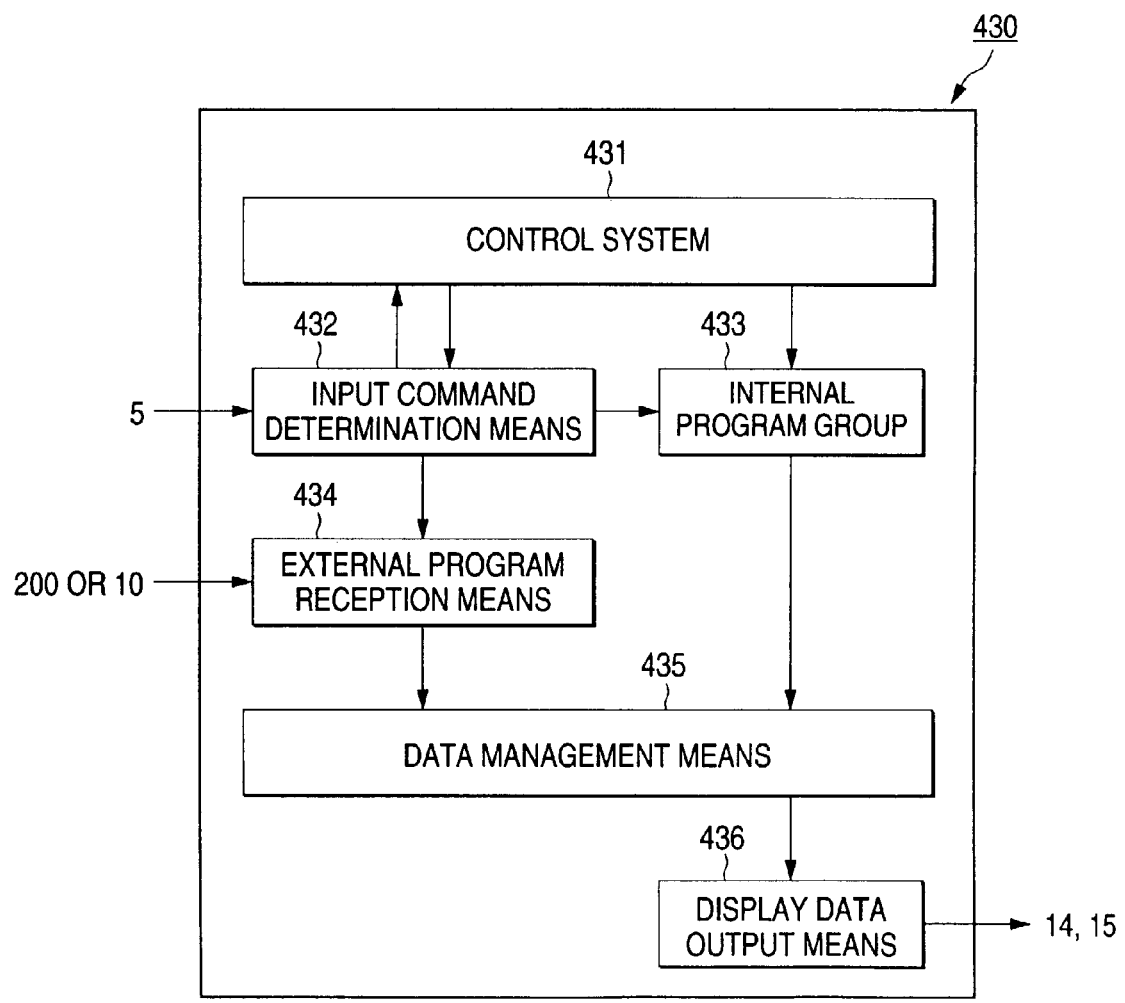
FIG. 2 is a block diagram to show a configuration example of control means stored in ROM.

FIG. 2 is a block diagram to show a configuration example of the control means 430 stored in the ROM 43. The control means 430 consists of means required for operation control of the digital camera 100, image data processing means required in the process of storing image data such as compression of image data, and means for decompressing compressed image data and preparing print data. Normally, the means are made of programs.

The control means 430 comprises a control system 431, input command determination means 432, an internal program group 433, external program reception means 434, data management means 435, and display data output means 436.

The control system 431 controls the whole operation of the digital camera 100, for example, an aperture motor drive section (not shown) in the optical system, the operation of the signal processing section 3, the frame memory 6, the signal processing section 7, and the recording medium control section 8, and execution of the input command determination means 432 to the display data output means 436.

When the user selects desired operation or processing by operating a switch, etc., disposed on the digital camera 100, the input command determination means 432 determines a digital signal output from the input means 5 and determines what the user-entered command operation is. According to the determination result, the input command determination means 432 transfers control to the corresponding program in the internal program group 433 or transfers control to the control system 431 for the external program reception means 434 to receive an external program.

The internal program group 433 consists of programs for controlling storage of picked-up image data in the recording medium 9, read or write of data from or into the expanded recording medium 10, LED display at the image picking up time, etc..; the programs are contained in the ROM 43 as basic processing programs. For example, the internal programs include a JPEG compression program required for writing image data into the recording medium 9.

The external program reception means 434 is started when the input command determination means 432 outputs an external program introduction command.

The external program reception means 434 determines which of the PC or the like, the expanded recording medium 10, and the communication line a program is to be introduced from by the contents of the external program introduction command and performs corresponding reception processing, then transfers control to the data management means 435.

When picked-up image data is written into the recording medium 9, deleted, or added or program code introduced from the outside is written, deleted, or added, the data management means 435 performs data management equivalent to file management widely performed in a computer such as the PC.

The image data (data compressed in JPEG) and thumbnail image data are processed by the internal program 433 or its equivalent circuit and are written into the recording medium 9 by the recording medium control section 8.

The display data output means 436 outputs LED display data, image data, or display data of a menu, etc., to the LED display means 15 or the liquid crystal display 16 of the digital camera 100.

FIG. 3 is a block diagram to show a configuration example of image selection means 45.

Image selection means 45A shown in FIG. 3*a* comprises print image selection means 453 for displaying picked-up image data on the liquid crystal display 16 in order for the user to select a desired print image and output method specification means 454 for specifying print specifications of the number of print sheets, print paper size, print color mode (full color, single color, monochrome), etc., and an external system to which the image data is to be transmitted. (See first embodiment.)

Image selection means 45B shown in FIG. 3*b* comprises thumbnail image display means 452 for displaying thumbnail image data on the liquid crystal display 16 in a fast forward manner, print image selection means 453' for requesting the user to select a desired image from among displayed thumbnail images and displaying the image data corresponding to the user-selected thumbnail image for the user to recognize it, and output method specification means 454 for specifying print specifications and an external system to which the image data is to be transmitted. (See second embodiment.)

Image selection means 45C shown in FIG. 3*c* comprises thumbnail image print means 452' for adding index code to thumbnail image data and transmitting to a printer for printing thumbnail images, print image selection means 453" for displaying a thumbnail image selection screen on the liquid crystal display 16 for the user to specify a desired image based on the printed thumbnail images and displaying the specified image data for the user to recognize it, and output method specification means 454 for specifying print specifications and an external system to which the image data is to be transmitted. (See third embodiment.)

Image selection means 45D shown in FIG. 3*d* comprises additional image selection method specification means 451 for the user to select either the image selection means 45B or 45C.

The image selection means 45A, 45B, 45C, or 45D may be introduced from the outside or can also be stored in the ROM 43 as one of the internal programs 433 making up the control means 430 (FIG. 2). The output method specification means 454 has a setup value registration table comprising setup values and image index numbers provided in a one-to-one correspondence with each other.

Figure 4:
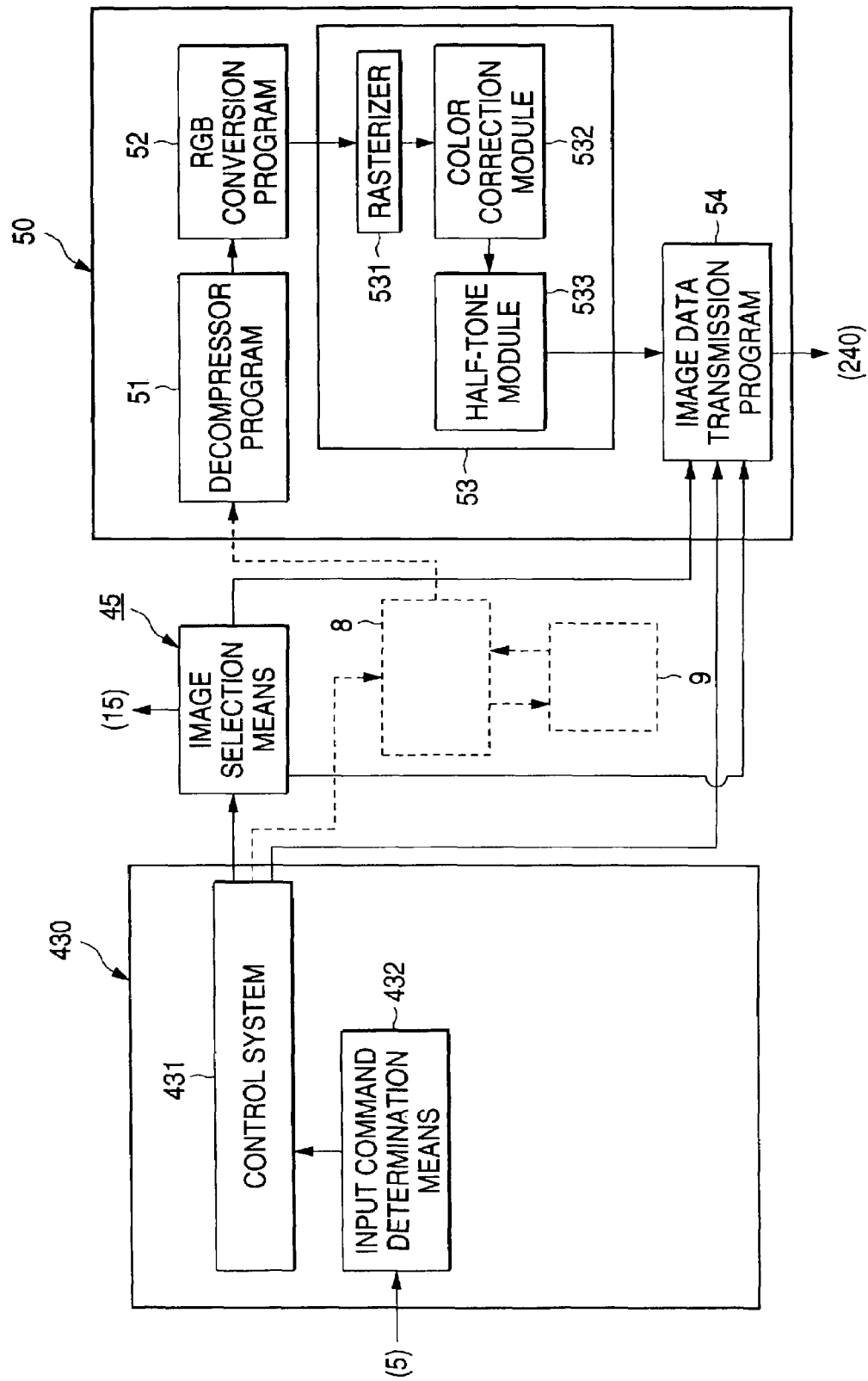
FIG. 4 is a block diagram to show the relationship among image selection means, print image data preparation programs, and control means.
Figure 5:
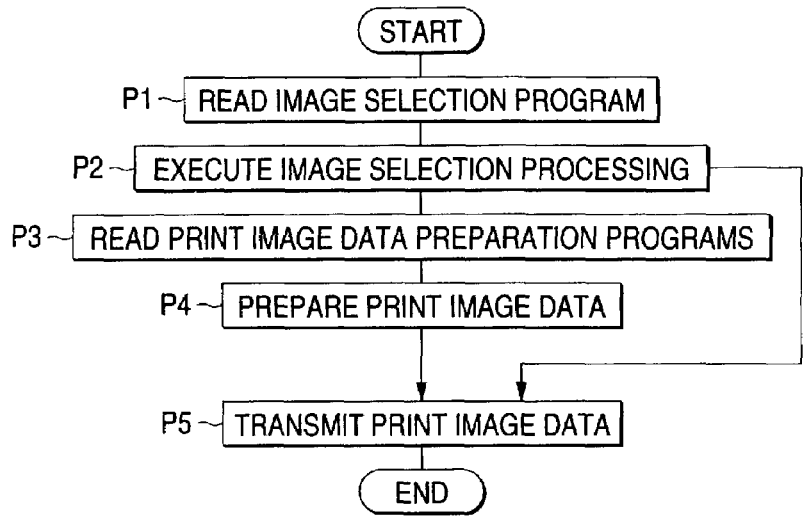
FIG. 5 is a flowchart to show brief operation of a control section.

FIG. 4 is a schematic representation to execute a direct print function for transmitting print image data to a printer, showing the relationship among the image selection means 45, the print image data preparation program group 50, and the control means 430. FIG. 5 is a flowchart to show the operation of the control section 4 when the direct print function is executed.

In FIG. 4 and FIG. 5, when the user turns on an image selection processing switch, the input command determination means 432 gives code meaning image selection to the control system 431, which then reads the image selection means (program) 45 from the ROM 43 or the recording medium 9 through the recording medium control section 8 at step P1.

When the image selection means 45 is expanded in the RAM 42, the control system 431 transfers control to the image selection means 45. When the user selects a desired image and specifies a desired output method, the image selection means 45 goes to step P3 if the external system to which image data is to be transmitted is the printer 240 or a facsimile machine. If the external system is the PC 200 or image data is sent to the communication line through the modem 150, the image selection means 45 goes to step P5 and transfers control to the control system 431 (P2).

The control system 431 gives an instruction for reading the print image data preparation program group 50 stored in the ROM 43 or the recording medium 9 through the recording medium control section 8. The programs (51, 52, 531, 532, 533, 54) in the print image data preparation program group 50 are read in the instruction order of the control system 431 and are expanded in the RAM 42 at step P3.

The control system 431 transfers control to the programs in the print image data preparation program group 50 in order for preparing print image data. At the termination of preparing the print image data at step P4, control goes to step P5. The 1-frame image data can also be divided into several blocks in the subscanning direction for preparing the print image data.

If the specified external system is the printer 240, the image data transmission means 54 transmits print image data and print control data via the interface 11 to the printer 240. If the specified external system is a facsimile machine, the image data transmission means 54 transmits monochrome print image data. If the external system is the PC 200 or image data is sent to the communication line through the modem 150, the image data transmission means 54 transmits image data or print image data and print control data at step P5.

UV components of the image data (YUV component data) transferred to the print image data preparation program group 50 are set to U=u and V=v ($-1<u<1$ and $-1<v<1$), whereby the image data output from the print image data preparation program group 50 can be made single-color (for example, sepia, blue, or green) image data. U=0 and V=0 are set, whereby the image data output from the print image data preparation program group 50 can be made monochrome image data.

The print image data preparation program group 50 contains a data decompression program 51 for decompressing compressed data read from the recording medium 9, an RGB conversion program 52 for converting image data consisting of YUV components into RGB components, a printer driver 53, and image data transmission program 54 for transmitting print data.

The printer driver 53 has the same configuration as a printer driver for preparing print data in PC, etc., and comprises three modules of rasterizer, color correction, and halftone to provide binary data.

Preferably, a color conversion parameter is added to the RGB conversion program 52 and a UV value conversion routine for setting U=0 and Y=0 at the preceding stage of RGB conversion when the color conversion parameter is set to a given value (for example, '0, 0') is added.

The image data transmission program 54 can also be configured to transmit print image data with the digital camera 100 connected to the communication line through the modem connected to the interface 11. Further, it can also be configured to transmit print image data by wireless with the digital camera l0b connected to a radio unit such as a portable telephone through the modem connected to the interface 11.

Figure 6:
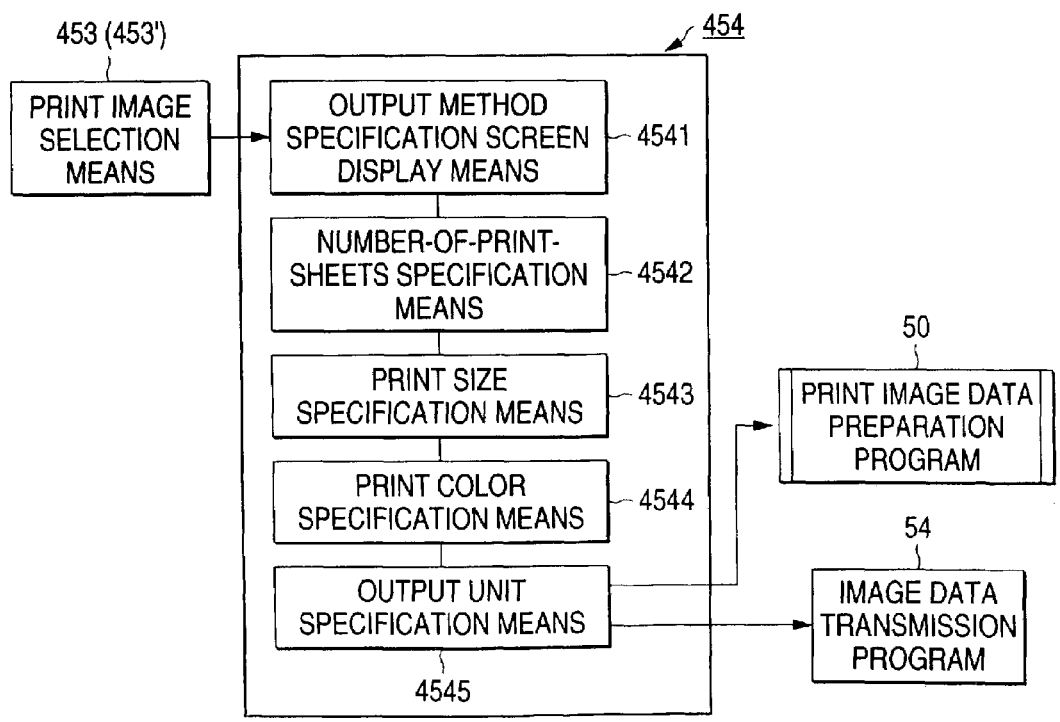
FIG. 6 is a block diagram to show a configuration example of output method specification means.

FIG. 6 is a block diagram to show the configuration of the output method specification means 454. The output method specification means 454 comprises output method specification screen display means 4541 for displaying an output method specification screen for specifying print specifications and an external system to which image data is to be transmitted (FIG. 7*b*), number-of-print-sheets specification means 4542 for specifying the number of print sheets, print size specification means 4543 for specifying a print paper size, print color mode specification means 4544 for specifying a print color mode, and output unit specification means 4545 for specifying an external system to which image data is to be transmitted.

Preferably, the print size specification means 4543 comprises a table in which print paper sizes, such as A4, A6, and postcard or business card size, L format, and E format used with normal silver salt photos, are previously registered.

Figure 7:
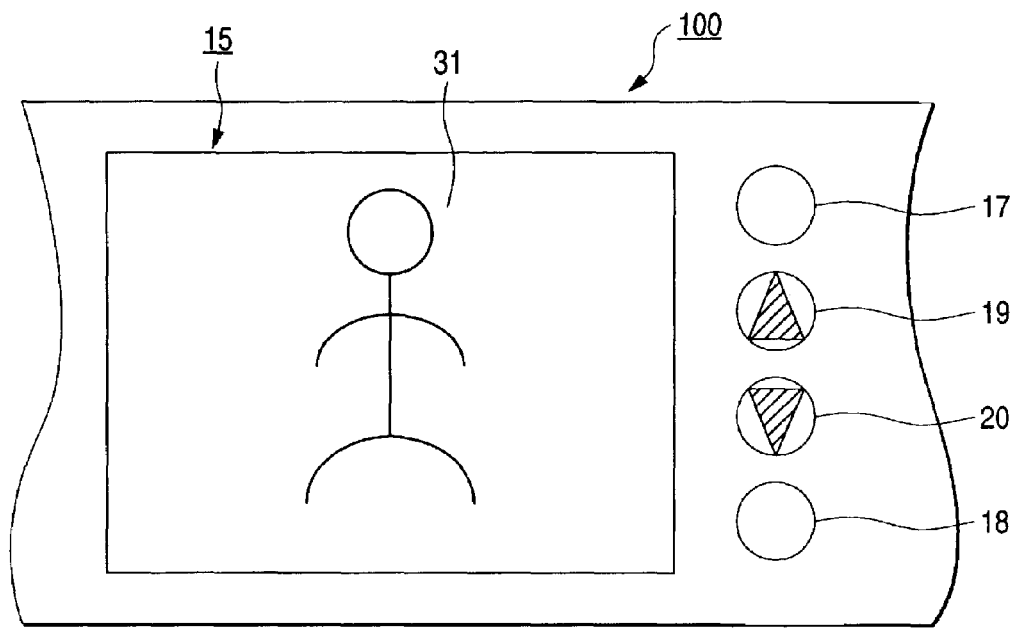
FIGS. 7(a)-7(b) are examples of a rear part view of the digital camera.
Figure 7:
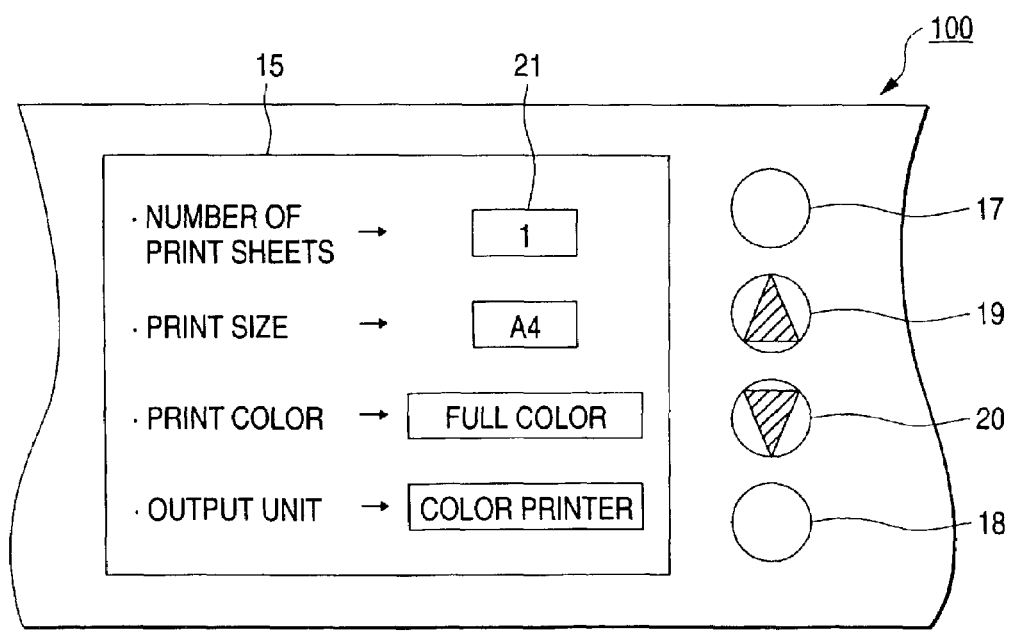

FIG. 7 shows an example of the rear part of the digital camera 100. The digital camera 100 is provided on the rear with the liquid crystal display 16 for displaying an image or a function menu, etc., buttons 19 and 20 for scrolling the screen of the liquid crystal display 16 up and down and from side to side, and function selection buttons 17 and 18. FIG. 7*a* provides an image display example and 7*b* provides an output method specification screen example.

Embodiment

Embodiments of image selection means 45 (45A, 45B, 45C, 45D) will be discussed.

First Embodiment

Figure 8:
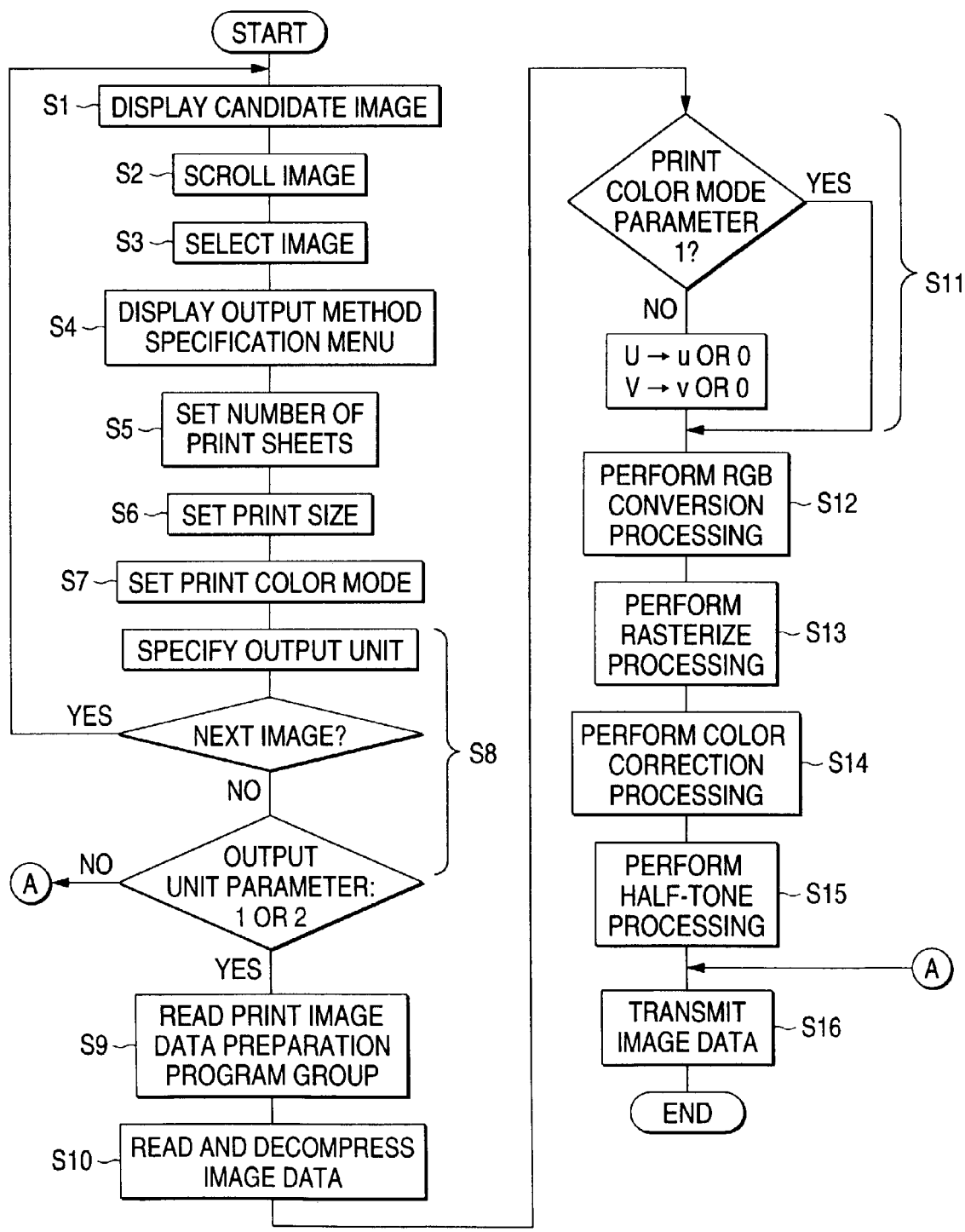
FIG. 8 is a flowchart to show an operation example from image selection to print image data preparation.

FIG. 8 is a flowchart to show an operation example of image selection means 45A. In the operation example, photographed image data pieces are displayed in order on a liquid crystal display and the user is requested to select a desired print image and specify print specifications of the number of print sheets, print paper size, print color mode (color, single color, or monochrome), etc., then print image data is prepared and transmitted to an external system.

When the image selection means 45A is transferred to a RAM 42, a control system 431 transfers control to the image selection means 45A. Print image selection means 453 reads 1-frame image data, transfers the image data to a frame memory 6, uses a data decompression program to decompose JPEG image data, and displays a candidate image 31 on a liquid crystal display 16 at step S1. In this case, an index number is added to the candidate image on the display.

If the user continues to press a button 19, the print image selection means 453 displays candidate images in order. When the user releases the button, the print image selection means 453 stops the display at the current image. If the user continues to press a button 20, the print image selection means 453 displays the preceding candidate images in order. When the user releases the button, the print image selection means 453 stops the display at the current candidate image at step S2.

If the user presses either the button 17 or 18, the print image selection means 453 assumes the candidate image to be selected and transfers control to output method specification means 454 at step S3.

The output method specification means 454 displays an output method specification menu as shown in FIG. 7*b* by output method specification screen display means 4541, prompting the user to select or enter the print specifications and the external system to which image data is to be transmitted.

At this time, initial display is, for example, "number of print sheets=1, print paper size=A4, print color mode=full color, output unit=color printer." The inside of a box 21 that can be specified or selected is displayed in a color different from the colors of other boxes at step S4.

First, when the user presses the button 17 or 18, number-of-print-sheets specification means 4542 goes to a step for specifying the number of print sheets. Each time the user presses a button 19, the number of print sheets is incremented by one starting at the initial value and the resultant number of sheets is displayed. Each time the user presses a button 20, the number of print sheets displayed is decremented by one. If the user presses either the button 17 or 18, the current display value is set as the number of print sheets and is stored in the location corresponding to the image index number in a setup value registration table at step S5 and control goes to the next step.

When the user presses the button 17 or 18, print size specification means 4543 goes to a step for selecting a print paper size and displays the contents of a print size registration table in which print paper sizes are previously registered. If the user presses the button 19 or 20 to select a desired print paper size and presses the button 17 or 18, the selected print paper size is set and is stored in the location corresponding to the image index number in the setup value registration table at step S6 and control goes to the next step.

When the user presses the button 17 or 18, print color mode specification means 4544 goes to a step for selecting a print color mode and displays the contents of a print color mode registration table in which print color modes are previously registered. If the user presses the button 19 or 20 to select a desired print color mode and presses the button 17 or 18, the selected print color mode is set. If full color is selected as the print color mode, a print color mode parameter in an RGB conversion program 52 is set to 1. If a single color is selected as the print color mode, the print color mode parameter in the RGB conversion program 52 is set to 2. If monochrome is selected as the print color mode, the print color mode parameter in the RGB conversion program 52 is set to 3. The print color mode parameter is stored in the location corresponding to the image index number in the setup value registration table at step S7.

When the user presses the button 17 or 18, output unit specification means 4545 goes to a step for selecting an output unit and displays the contents of an output unit registration table in which output units are previously registered. If the user selects a color printer as the output unit, an output unit parameter in an image data transmission program 54 is set to 1. If the user selects a facsimile as the output unit, the output unit parameter in the image data transmission program 54 is set to 2. If the user selects a PC as the output unit, the output unit parameter in the image data transmission program 54 is set to 3. If the user selects a communication terminal as the output unit, the output unit parameter in the image data transmission program 54 is set to 4. If the user presses the button 17 or 18, the selected output unit is set and the setup value corresponding to the selected output unit is stored in the location corresponding to the image index number in the setup value registration table, then control returns to step S1 to display another candidate image. If another candidate image does not exist, the output unit parameter value is checked. If the value is 1 or 2, control goes to step S9; if the value is 3 or 4, control goes to step S16.

The control system 431 expands programs contained in a print image data preparation program group 50 in the RAM 42 in order and transfers control to a compressed data decompression program 51 at step S9.

The compressed data decompression program 51 reads image data (JPEG image data) selected by the print image selection means 453 into the RAM 42 and decompresses the data at step S10.

At the termination of decompressing the compressed image data, the RGB conversion program 52 checks the print color mode parameter at step S11. If the print color mode parameter has a value of 1, control goes to step S12. If the print color mode parameter has a value of 2, all UV components of the image data are converted into U=u and V=v. If the print color mode parameter has a value of 3, all UV components of the image data are converted into U=0 and V=0.

The RGB conversion program 52 converts the image data consisting of YUV components into image data consisting of R (red), G (green), and B (blue) components at step S12. When the UV components are U=u and V=v, the image data is converted into single-color image data. When the UV components are U=0 and V=0, the image data is converted into monochrome image data.

A rasterizer 531 converts the image data into RGB continuous-tone (for example, 256-gray-level) bit image data undergoing raster conversion for each of R, G, and B at step S13.

A color correction module 532 applies color correction processing to the RGB continuous-tone bit image data to relate the data to print colors and converts the data into CMYK continuous-tone bit image data for K (black), C (cyan), M (magenta), and Y (yellow) printing at step S14.

A halftone module 533 uses a dither method or an error diffusion method to perform halftone processing for the CMYK continuous-tone bit image data at step S15, whereby a bit map binarized for each color (binary data table) is prepared.

At the termination of the halftone processing, the image data transmission program 54 checks the print color mode parameter. If the value of the print color mode parameter is 1, the image data transmission program 54 transmits the setup values of the number of print sheets and the print paper size, a print control signal, and binary bit map data to a color ink jet printer 240, for example, through an interface 11 at step S16. The color ink jet printer 240 can receive the print control signal and print data directly from the digital camera 100 and print a desired number of sheets of the photographed image on recording paper of a desired size.

If the user specifies a single color or monochrome as the print color mode, the image is printed in the single color or monochrome if it is color-photographed. If the value of the print color mode parameter is 2, the image data transmission program 54 transmits the setup values of the number of print sheets and the print paper size, a print control signal, and binary bit map data to a facsimile through an interface 11. If the value of the print color mode parameter is 3 or 4, the image data transmission program 54 transmits JPEG image data or the setup values of the number of print sheets and the print paper size, a print control signal, and binary bit map data to PC 200 through the interface 11 or a terminal connected to a communication line 160 through a modem 150.

Second Embodiment

Figure 9:
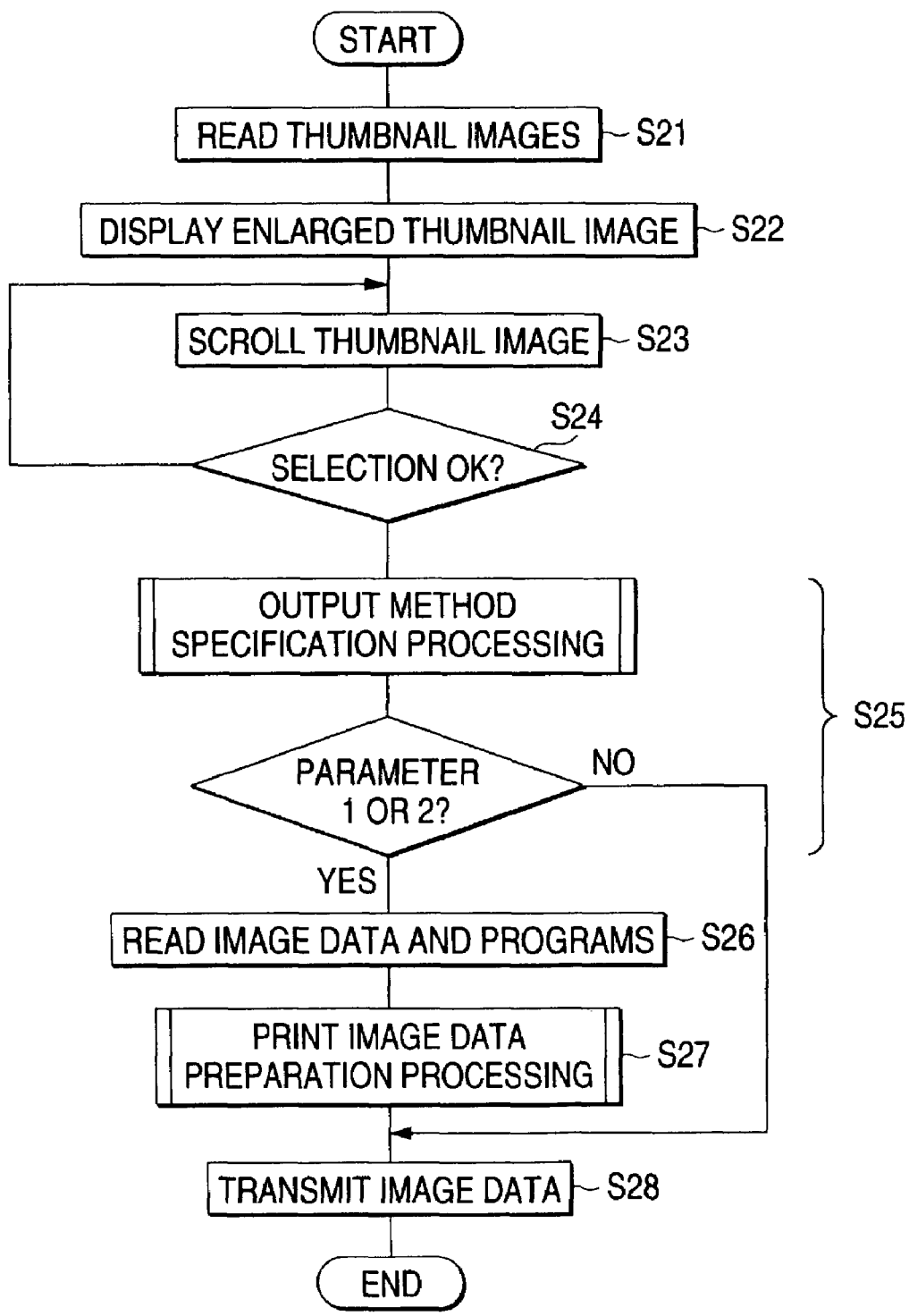
FIG. 9 is a flowchart to show another operation example from image selection to print image data preparation.

FIG. 9 is a flowchart to show an operation example of image selection means 45B (FIG. 3B) wherein thumbnail images are displayed and the user selects a desired image and specifies print specifications of the number of print sheets, print paper size, print color mode, etc., and an output unit to which image data is to be transmitted.

When the image selection means 45B is transferred to a RAM 42, a control system 431 transfers control to the image selection means 45B. Thumbnail image display means 452 reads all thumbnail image data and expands the data in the RAM 42 at step S21.

The thumbnail image display means 452 uses a data decompression program to decompose the thumbnail image data, enlarges the image data, adds an index number to the enlarged thumbnail image data, and displays the thumbnail image on a liquid crystal display 16 at step S22. A number of thumbnail images may be displayed on the liquid crystal display 16 without enlarging the thumbnail image data.

Each time the user presses a button 19, print image selection means 453' displays one enlarged thumbnail image. If the user stops pressing the button 19, the print image selection means 453' continues to display the current thumbnail image. Each time the user presses a button 20, the print image selection means 453' displays the preceding thumbnail image. If the user stops pressing the button 20, the print image selection means 453' continues to display the current thumbnail image at step S23.

If the user stops pressing the button 19 or 20 and presses either the button 17 or 18 with the thumbnail image displayed, the print image selection means 453' assumes the image to be selected. When the user selects images from among the thumbnail images and completes selection of desired images, the print image selection means 453' transfers control to the control system 431.

The control system 431 transfers control to output method specification means 454. At step S25, the output method specification means 454 handles output method specification processing of print specifications, an output unit to which image data is to be transmitted, etc., and checks the value of an output unit parameter at step S25. If the parameter value is 1 or 2, control goes to step S26; if the parameter value 3 or 4, control goes to step S27.

The control system 431 expands print image data and programs contained in a print image data preparation program group 50 in the RAM 42 in order and transfers control to the print image data preparation program group 50 at step S26.

The print image data preparation program group 50 performs similar processing to steps S10 to S15 in FIG. 8, namely, performs decompression processing of image data (JPEG image data) selected by the print image selection means 453', RGB conversion processing, rasterizing, color correction processing, and halftone processing at step S27.

At the termination of the halftone processing, as at step S16 in FIG. 8, an image data transmission program 54 checks the output unit parameter and transmits the print image data or JPEG image data to the specified output unit at step S28.

Third Embodiment

Figure 10:
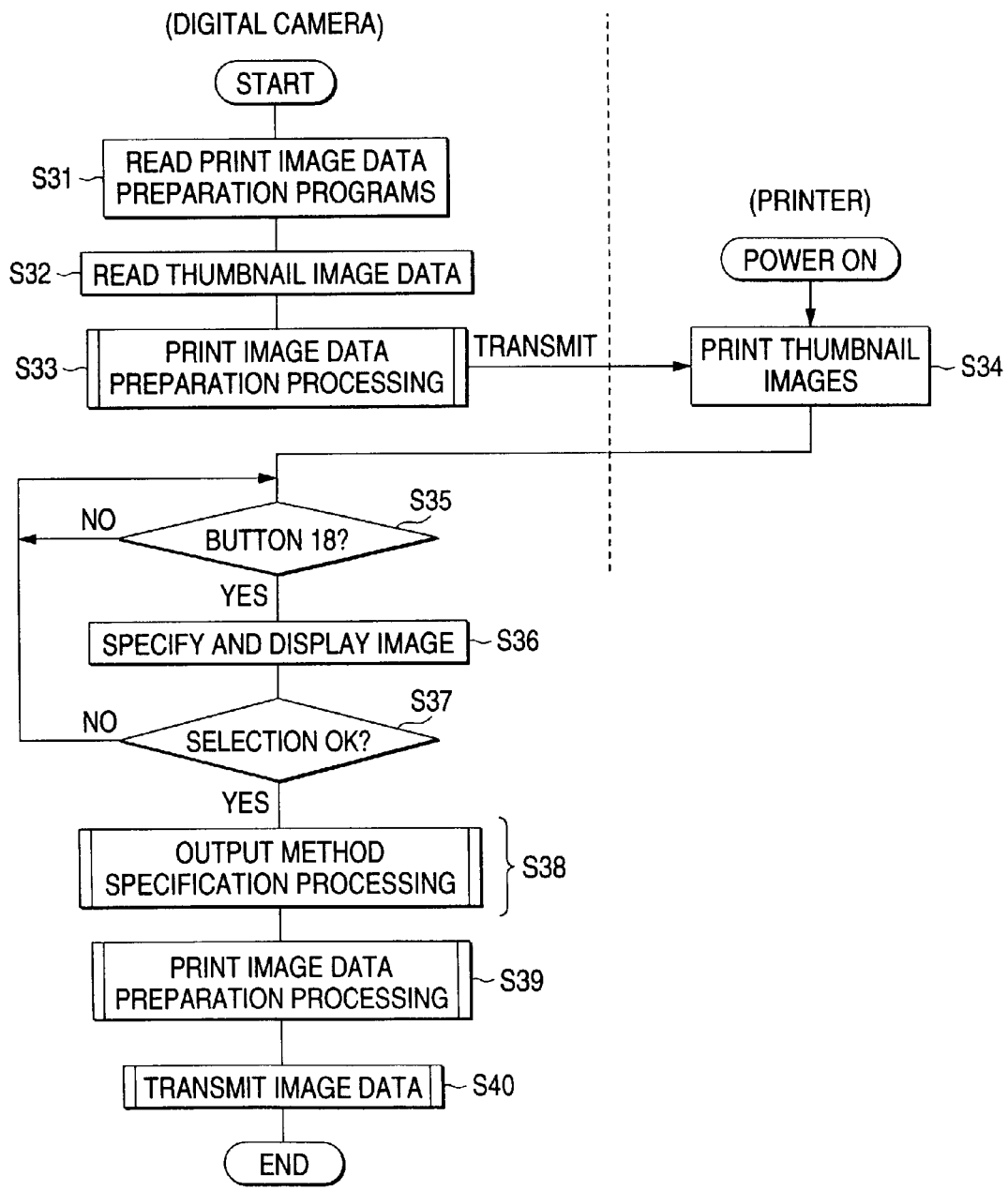
FIG. 10 is a flowchart to show another operation example from image selection to print image data preparation.
Figure 11:
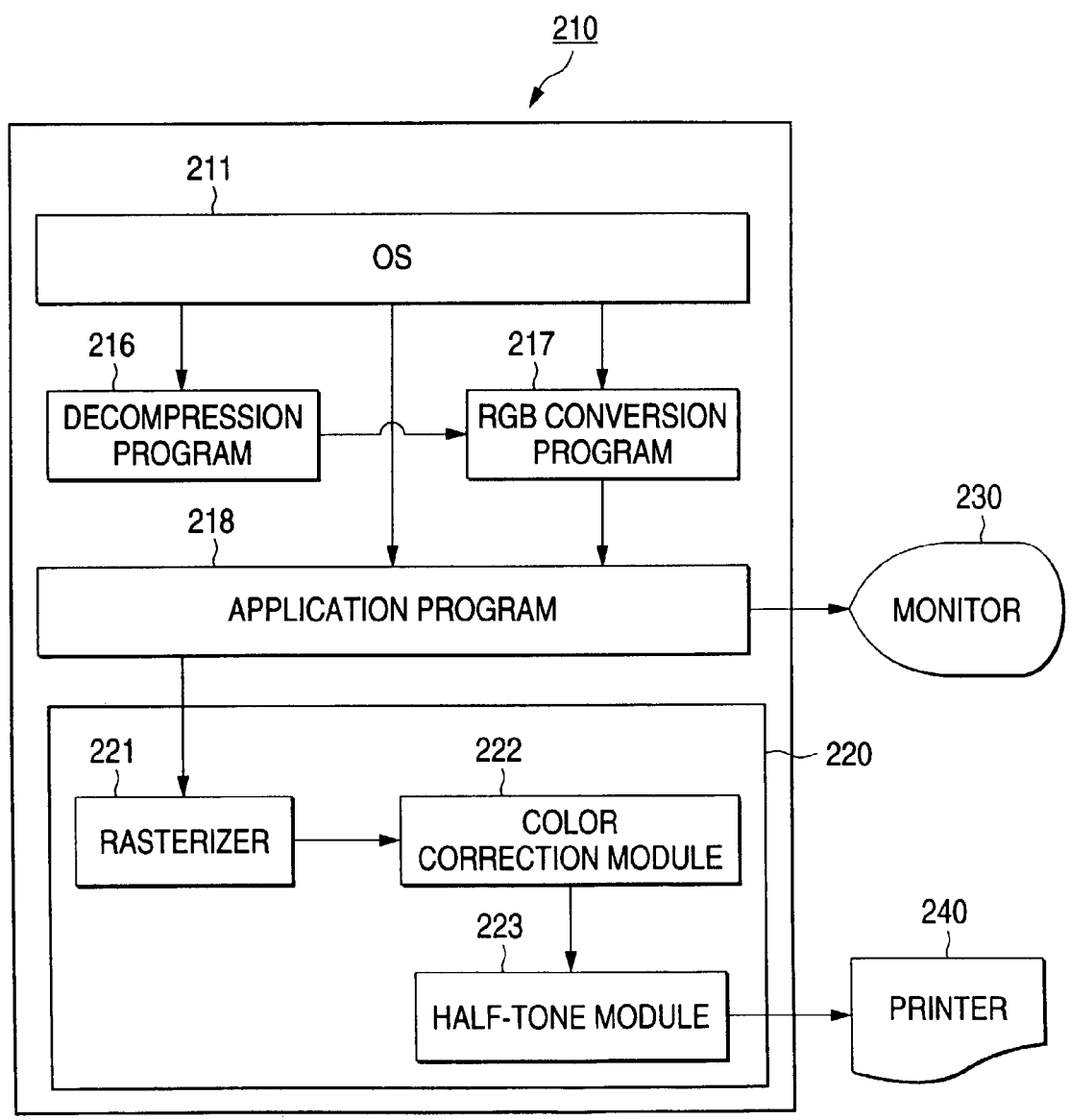
FIG. 11 is a block diagram to show an example of print image data preparation programs used to prepare print data on a personal computer.

FIG. 10 is a flowchart to show an operation example of image selection means 45C (FIG. 3c) wherein thumbnail image data is printed at a printer and the user selects a desired image from among the printed thumbnail images and specifies print specifications of the number of print sheets, print paper size, print color mode, etc., and an output unit to which image data is to be transmitted.

A control system 431 expands programs contained in a print image data preparation program group 50 in a RAM 42 in order and transfers control to the image selection means 45C at step S31.

Thumbnail image print means 452' reads all thumbnail image data, expands the image data in the RAM 42, decompresses the thumbnail image data in the RAM 42, and adds an index number to each thumbnail image data piece at step S32.

As described at steps S12 to S15 in FIG. 8, the print image data preparation program group 50 performs RGB conversion processing, rasterize processing, color correction processing, and halftone processing to prepare print thumbnail image data and transmits the image data to a printer 240 at step S33. In this case, the thumbnail image print means 452' may set U and V components of the thumbnail image data in the RAM 42 to U=0 and V=0 to print a monochrome thumbnail image at the printer 240.

Thumbnail images each with an index number are printed at the printer 240 at step S34.

Print image selection means 453' displays a message on a liquid crystal display, prompting the user to select a desired image from among the printed thumbnail images and enter the index number of the selected image at step S35.

If the user presses a button 19 as many times as the number of digits of the index number of the desired image and then presses a button 17 or 18, the print image selection means 453" reads the image data corresponding to the index number from a recording medium 9 into a frame memory 6 and displays the image on a liquid crystal display 16 at step S36.

If the user furthermore presses the button 17 or 18, the print image selection means 453" assumes the image to be selected and transfers control to output method specification means 454 at step S37.

The output method specification means 454 handles setting of print specifications and specification of an output unit to which image data is to be transmitted at step S38 as at steps S4 to S8 in FIG. 8. To select another candidate image, control returns to step S35. If another candidate image does not exist, the value of an output unit parameter is checked. If the parameter value is 1 or 2, control goes to step S39; if the parameter value is 3 or 4, control goes to step S40.

The print image data preparation program group 50 performs decompression processing of selected image data (JPEG image data), RGB conversion processing, rasterize processing, color correction processing, and halftone processing at step S39 as at steps S10 to S15 in FIG. 8.

At the termination of the halftone processing, as at step S16 in FIG. 8, an image data transmission program 54 checks the output unit parameter and transmits the print image data or JPEG image data to the specified output unit at step, S40.

It is understood that the foregoing description is preferred embodiments of the invention and that various changes and modifications may be made in the invention without departing from the spirit and scope thereof.

As described above, according to the invention, images are displayed on display means such as a liquid crystal display of the digital camera and the user selects a desired image from among the displayed images and specifies the print specifications of the number of print sheets, a print paper size, a print color mode, etc., then can transmit the print image data prepared based on the user's selection and specification from the digital camera to a printer. Therefore, a photographed image can be printed without intervention of another processing system such as a PC and it can be expected that digital cameras will come into wider use for those who do not have a PC, etc., or who have a PC, but are unfamiliar with handling the PC.

The invention claimed is:

1. A digital camera, comprising:
an image conversion device that converts a plurality of images into signals;
a recording medium that stores image data corresponding to the signals;
a display that displays at least one displayed image based on at least some of the stored image data; and
an input device,
wherein the at least one displayed image is selected to determine output image data when a user inputs a first command via the input device,
wherein the input of the first command causes the display to automatically display an output specification screen after the first command is input, and
wherein the user can select at least one predetermined output specification from the output specification screen via the input device.

2. The digital camera according to claim 1, wherein an external system processes the output image data based on the at least one predetermined output specification.

3. The digital camera according to claim 2, wherein the digital camera directly outputs the output image data to the external system.

4. The digital camera according to claim 1, wherein the first command is a selection command for selecting the at least one displayed image displayed on the display as at least one selected image.

5. The digital camera according to claim 4, wherein the at least one displayed image comprises at least one thumbnail image.

6. The digital camera according to claim 5, wherein the at least one thumbnail image is displayed on the display based on thumbnail image data stored in the recording medium to be associated with the stored image data.

7. The digital camera according to claim 5, wherein two or more of the at least one thumbnail image are sequentially displayed on the display before the user inputs the first command.

8. The digital camera according to claim 5, wherein two or more of the at least one thumbnail image are simultaneously displayed on the display before the user inputs the first command.

9. The digital camera of claim 4, wherein the user changes the at least one predetermined output specification by inputting a second command via the input device.

10. The digital camera of claim 9, wherein the input device comprises a scroll button, and wherein the user inputs the second command by depressing the scroll button.

11. The digital camera according to claim 9, wherein the at least one predetermined output specification includes at least one of a number of print sheets and a print paper size.

12. The digital camera according to claim 1, wherein, when the output specification screen is initially displayed, at least one initial output specification value for the at least one predetermined output specification is displayed on the output specification screen.

13. The digital camera according to claim 12, wherein the at least one initial output specification value includes an initial value for at least one of the number of print sheets and the paper size.

14. The digital camera according to claim 1, wherein the input device comprises at least one scroll button.

15. The digital camera according to claim 14, wherein the at least one scroll button allows a user to change the at least one displayed image displayed on the display.

16. The digital camera according to claim 14, wherein the at least one scroll button allows a user to change at least one output specification contained in the output specification screen to select the at least one predetermined output specification.

17. The digital camera according to claim 15, wherein the at least one scroll button allows the user to change at least one output specification contained in the output specification screen to select the at least one predetermined output specification.

18. The digital camera according to claim 15, wherein the input device further comprises at least one function button, wherein the at least one function button allows the user to select a displayed image displayed on the display.

19. The digital camera according to claim 16, wherein the input device further comprises at least one function button, wherein the at least one function button allows the user to select at least one output specification contained in the output specification screen as the at least one predetermined output specification.

20. The digital camera according to claim 17, wherein the input device further comprises at least one function button,
wherein the at least one function button allows the user to select at least one output specification contained in the output specification screen as the at least one predetermined output specification, and
wherein the at least one function button allows the user to select a displayed image displayed on the display.

21. The digital camera according to claim 1, wherein the input device includes a function button, wherein the user inputs the first command by depressing the function button under a first predetermined condition.

22. The digital camera according to claim 21, wherein the first predetermined condition includes a condition in which a desired image is currently displayed on the display as the at least one displayed image.

23. The digital camera according to claim 22, wherein the input device includes a scroll button, wherein the user can change the at least one displayed image displayed on the display by inputting a second command via the scroll button before the first command is input.

24. The digital camera according to claim 23, wherein, when the output specification screen is initially displayed, at least one initial output specification value for the at least one predetermined output specification is displayed on the output specification screen, wherein the at least one initial output specification value displayed on the output specification screen is changed only when the user inputs a third command via the scroll button.

25. The digital camera according to claim 22, wherein the user sets at least one output specification value, which is currently displayed on the output specification screen, as the at least one predetermined output specification by inputting a command via the function button.

26. The digital camera according to claim 24, wherein the user sets at least one output specification value, which is currently displayed on the output specification screen, as the at least one predetermined output specification by inputting a command via the function button.

27. The digital camera according to claim 1, wherein the at least one predetermined output specification includes at least one of a number of sheets and a paper size.

28. The digital camera according to claim 1, wherein the at least one predetermined specification includes data indicative of an external device to which the user desires to the output image data from the digital camera and that is selected by a user from available external devices including at least two of a printer, a facsimile, a PC and a communication terminal.

29. The digital camera according to claim 28, wherein the communication terminal includes a wireless telephone.

30. The digital camera according to claim 1, further comprising conversion software contained in the digital camera, wherein the conversion software formats the output image data to be output from the digital camera to an external system.

31. The digital camera according to claim 30, wherein the conversion software is supplied to the digital camera from an external source and is installed in a memory contained within the digital camera.

32. The digital camera according to claim 30, wherein the conversion software comprises a printer driver, and wherein the printer driver comprises at least one of a rasterizer module, a half tone module, and a color correction module.

33. The digital camera according to claim 1, wherein conversion software formats the output image data based on the at least one predetermined output specification.

34. The digital camera according to claim 33, wherein the conversion software comprises a printer driver, and wherein the printer driver comprises at least one of a rasterizer module, a half tone module, and a color correction module.

35. The digital camera according to claim 1, wherein the digital camera comprises a wireless transmitter that transmits the output image data to an external system by wireless transmission.

36. The digital camera according to claim 35, wherein the external system is a wireless telephone.

37. The digital camera according to claim 1, wherein the stored image data includes higher resolution image data.

38. The digital camera according to claim 37, wherein the stored image data further includes lower resolution image data associated with the higher resolution image data.

39. The digital camera according to claim 38, wherein the lower resolution image data includes thumbnail image data.

40. The digital camera according to claim 37, wherein the at least one displayed image is displayed on the display based on the higher resolution image data.

41. The digital camera according to claim 39, wherein the at least one displayed image is displayed based on the thumbnail image data.

42. The digital camera according to claim 41, wherein the at least one displayed image is displayed based on the thumbnail image data by enlargement.

43. The digital camera according to claim 37, wherein the output image data includes the higher resolution image data.

44. The digital camera according to claim 37, wherein the output image data includes data obtained based on the higher resolution image data.

45. The digital camera according to claim 39, wherein the output image data includes the thumbnail image data.

46. The digital camera according to any one of claims 43 to 45, wherein the output image data further includes data indicative of the at least one predetermined output specification selected by the user.

47. A digital camera, comprising:
an image conversion device that converts a plurality of images into signals;
a recording medium that stores image data corresponding to the signals;
a display that displays at least one displayed image based on at least some of the stored image data; and
an input device having first and second buttons,
wherein two or more of the at least one displayed image are sequentially displayed on the display when the first button is continuously depressed;
wherein an output specification screen for a currently displayed one of the at least one displayed image is displayed on the display when the second button is depressed.

48. The digital camera according to claim 47, wherein the currently displayed one of the at least one displayed image is selected to determine output image data when the second button is depressed.

49. The digital camera according to claim 47, wherein a user can select at least one predetermined output specification from the output specification screen.

50. The digital camera according to claim 49, wherein the at least one predetermined output specification includes a number of copies.

51. The digital camera according to claim 49, wherein the first button is used to change a displayed value of an output specification in the output specification screen, and the second button is used to set a currently displayed value of the output specification in the output specification screen as the at least one predetermined output specification.

52. A method of outputting image data from a digital camera including a display and an input device, the method comprising:
converting a plurality of images into signals;
storing image data corresponding to the signals;
displaying at least one displayed image on the display based on at least some of the stored image data;
selecting the at least one displayed image to determine output image data when a first command is input via the input device;
automatically displaying an output specification screen in response the first command; and
selecting at least one predetermined output specification from the output specification screen via the input device.

53. A method of outputting image data from a digital camera including a display and an input device having first and second buttons, the method comprising:
converting a plurality of images into signals;
storing image data corresponding to the signals;
displaying at least one displayed image on the display based on at least some of the stored image data;
sequentially displaying two or more of the at least one displayed image on the display when the first button is continuously depressed; and
displaying an output specification screen for a currently displayed one of the at least one displayed image on the display when the second button is depressed.

54. The digital camera according to claim 4, wherein at least two or more of the at least one displayed image are sequentially displayed on the display before the user inputs the first command.

55. The digital camera according to claim 4, wherein at least two or more of the at least one displayed image are simultaneously displayed on the display before the user inputs the first command.

56. The digital camera according to claim 1, wherein the output image data is directly transmitted to a printer when the specifying of the output specification, by a switch operation of the digital camera, is complete.

57. The digital camera according to claim 1, wherein the output image data and the specified number of copies are directly transmitted to a printer when the specifying of the print specification, by a button operation of the digital camera, is complete.

58. The digital camera according to claim 47, wherein output image data is directly transmitted to a printer in response to completion of the output specification screen by a switch operation of the digital camera.

59. The apparatus according to claim 47, wherein output image data and a specified number of copies are directly transmitted to a printer in response to completion of the output specification screen by a button operation of the digital camera.

60. The method according to claim 52, wherein the output image data is directly transmitted to a printer when the selecting of the at least one predetermined output specification, by a switch operation of the digital camera, is complete.

61. The method according to claim 52, wherein the output image data and a specified number of copies are directly transmitted to a printer when the selecting of the at least one predetermined output specification, by a button operation of the digital camera, is complete.

62. The method according to claim 53, wherein output image data is directly transmitted to a printer in response to the completion of the output specification screen by a switch operation of the digital camera.

63. The method according to claim 53, wherein output image data and a specified number of copies are directly transmitted to a printer in response to the completion of the output specification screen by a button operation of the digital camera.

* * * * *